US009968913B2

(12) United States Patent
Duhamel et al.

(10) Patent No.: US 9,968,913 B2
(45) Date of Patent: May 15, 2018

(54) PROCESS FOR PRODUCTION OF HYDROGEN

(71) Applicants: CENTRE NATIONAL DE LA RECHERCHE SCIENTIFIQUE, Paris (FR); UNIVERSITE DES SCIENCES ET TECHNOLOGIES DE LILLE—LILLE 1, Villeneuve d'ascq (FR)

(72) Inventors: Louise Duhamel, Villeneuve d'ascq (FR); Wenhao Fang, Villeneuve d'ascq (FR); Sebastien Paul, Thun Saint Amand (FR); Franck Dumeignil, Fretin (FR)

(73) Assignees: CENTRE NATIONAL DE LA RECHERCHE SCIENTIFIQUE, Paris (FR); UNIVERSITE LILLE 1, Villeneuve d'Ascq (FR)

( * ) Notice: Subject to any disclaimer, the term of this patent is extended or adjusted under 35 U.S.C. 154(b) by 215 days.

(21) Appl. No.: 14/655,487

(22) PCT Filed: Jan. 9, 2014

(86) PCT No.: PCT/FR2014/050025
§ 371 (c)(1),
(2) Date: Jun. 25, 2015

(87) PCT Pub. No.: WO2014/108636
PCT Pub. Date: Jul. 17, 2014

(65) Prior Publication Data
US 2015/0352528 A1 Dec. 10, 2015

(30) Foreign Application Priority Data

Jan. 10, 2013 (FR) ...................................... 13 50218

(51) Int. Cl.
*B01J 37/14* (2006.01)
*B01J 37/03* (2006.01)
(Continued)

(52) U.S. Cl.
CPC ............. *B01J 23/83* (2013.01); *B01J 37/009* (2013.01); *B01J 37/03* (2013.01); *B01J 37/14* (2013.01);
(Continued)

(58) Field of Classification Search
CPC . Y02P 20/52; C01B 2203/1229; C01B 3/326; C01B 2203/1058;
(Continued)

(56) References Cited

FOREIGN PATENT DOCUMENTS

FR 2876996 4/2006
WO 2004041724 5/2004

OTHER PUBLICATIONS

Pirez et al. "Highly Efficient and Stable CeNiHZOY Nano-Oxyhydride Catalyst for H2 Production from Ethanol at Room Temperature" Angew. Chem. Int. Ed. 2011, 50, 10193-10197.*
(Continued)

*Primary Examiner* — Anthony J Zimmer
*Assistant Examiner* — Syed T Iqbal
(74) *Attorney, Agent, or Firm* — Ipsilon USA, LLP (57) ABSTRACT

The present invention relates to a process for production of hydrogen at low temperature starting from alcohols without formation of carbon using an oxyhydride material based on cerium and nickel and to the use of such a material as catalyst for transformation of alcohols to hydrogen.

15 Claims, 5 Drawing Sheets

(51) Int. Cl.
*B01J 23/83* (2006.01)
*B01J 37/00* (2006.01)
*C01B 3/32* (2006.01)
*B01J 37/18* (2006.01)
*B01J 35/00* (2006.01)
*B01J 35/02* (2006.01)
*B01J 35/10* (2006.01)

(52) U.S. Cl.
CPC ............... *B01J 37/18* (2013.01); *C01B 3/326* (2013.01); *B01J 35/002* (2013.01); *B01J 35/023* (2013.01); *B01J 35/1014* (2013.01); *B01J 35/1019* (2013.01); *C01B 2203/0233* (2013.01); *C01B 2203/1058* (2013.01); *C01B 2203/1217* (2013.01); *C01B 2203/1229* (2013.01); *Y02P 20/52* (2015.11)

(58) Field of Classification Search
CPC ...... C01B 2203/0233; C01B 2203/1217; B01J 37/03; B01J 23/83; B01J 37/14; B01J 37/009; B01J 35/002; B01J 37/18; B01J 35/1019; B01J 35/1014; B01J 35/023
See application file for complete search history.

(56) References Cited

OTHER PUBLICATIONS

Jalowiecki—Duhamel et al.: "Hydrogen production from ethanol steam reforming over cerium and nickel based oxyhydrides." dated Dec. 1, 2010.
Wenhao Fang et al.: "Ce—Ni mixed oxide as efficient catalyst for H2 production and nanofibrous carbon material from ethanol in the presence of water" dated Jan. 1, 2012.
Search Report dated 2014.
Pirez et al.: "Highly efficient and stable CeNiHzOy nano-oxyhydride catalyst for H2 production from ethanol at room tempertaure" dated 2011.

* cited by examiner

PROCESS FOR PRODUCTION OF HYDROGEN

RELATED APPLICATIONS

This application is a National Phase Application of PCT/FR2014/050025, filed on Jan. 9, 2014, which in turn claims the benefit of priority from French Patent Application No. 13 50218 filed on Jan. 10 2013, the entirety of which are incorporated herein by reference.

BACKGROUND

Field of the Invention

The present invention relates to a process for production of hydrogen at low temperature starting from alcohols without formation of carbon, using an oxyhydride material based on cerium and nickel, and to the use of such a material as catalyst for the transformation of alcohols to hydrogen.

Description of Related Art

The gas dihydrogen $H_2$, more commonly called "hydrogen", can be used in various applications on account of its high energy potential. As it does not exist in the natural state, it must be manufactured starting from a primary energy source, and then transported, stored and distributed to the user.

Hydrogen is now being offered as a source of energy and can be converted to electricity, heat or motive force depending on the end use. Hydrogen may in particular be used for supplying fuel cells, which then constitute electrochemical converters that produce electricity and heat by oxidation of a gaseous fuel hydrogen and by reduction of oxygen. Fuel cells supplied with hydrogen can be used in stationary systems in the areas of dwellings, industry and networks, and in mobile systems in the field of transport and portable equipment (telephones, computers). The use of hydrogen as a principal energy vector and fuel could contribute on the one hand to reduction of the global dependence on fossil energy and on the other hand to reduction of emissions of greenhouse gases ($CH_4$, $CO_2$) and atmospheric pollution (CO, $NO_R$).

Today, hydrogen is essentially produced starting from hydrocarbons by steam reforming of natural gas or by gasification of petroleum residues or of coal. From the economic standpoint, the most attractive processes for producing hydrogen starting from fossil energy sources involve the transformation of light hydrocarbon feeds to synthesis gas, consisting of a mixture of hydrogen $H_2$, carbon monoxide CO, carbon dioxide $CO_2$, methane $CH_4$ and water $H_2O$. This gas is obtained by reaction of hydrocarbons with steam in the presence of a nickel catalyst. The drawback of these processes is that the transformation takes place at high temperature (840° C. to 950° C.) and at moderate pressure (20 to 30 bar) and that they involve fossil resources.

In order to meet the constant industrial needs in terms of new fuel cell technologies and environmental and economic constraints, there is growing interest in renewable energy sources that are a priori inexhaustible and cause less environmental disturbance than the fossil energy sources. They offer the advantage that they make a negligible contribution to the increase in the greenhouse effect and give a cost gain connected with low supply of energy.

These renewable energy sources include alcohols and in particular bio-ethanol obtained from biomass. Ethanol is the most widely used biofuel. It is produced starting from three main types of crops: sugar plants (for example sugar cane and sugar beet), amylaceous plants (for example wheat and maize) and lignocellulosic materials (for example wood).

Endothermic steam reforming of ethanol takes place according to reaction (1):

$$C_2H_5OH + 3H_2O \rightarrow 6H_2 + 2CO_2 \qquad (1)$$

This reaction takes place in the presence of steam and requires supply of energy. In practice, it is necessary to assist the reaction, notably using catalysts. The energy required for this reaction can be supplied by adding oxygen or air to the reaction mixture. There is then an exothermic reaction of partial oxidation of the ethanol, defined below:

$$C_2H_5OH + 1.5O_2 \rightarrow 3H_2 + 2CO_2 \qquad (2)$$

In the course of this reaction, a proportion of the ethanol is burnt, supplying the energy necessary for reaction (1) to take place simultaneously.

However, production of hydrogen from ethanol has drawbacks, such as the formation of by-products and deactivation of the catalysts depending on the operating conditions and the catalysts used.

In fact, dehydrogenation of ethanol produces acetaldehyde and hydrogen according to reaction (3), whereas decomposition of ethanol (and/or of acetaldehyde) produces methane, carbon monoxide and hydrogen according to reaction (4):

$$C_2H_5OH \rightarrow C_2H_4O + H_2 \qquad (3)$$

$$C_2H_5OH \rightarrow CH_4 + CO + H_2 \qquad (4)$$

Methane has the characteristic of being very difficult to reform, which has an adverse effect on the yield of $H_2$.

Acetone may also be generated according to reaction (5):

$$2C_2H_5OH + H_2O \rightarrow CH_3COCH_3 + CO_2 + 4H_2 \qquad (5)$$

Finally, a carbon deposit may be observed on the catalyst. This carbon deposit may result from various reactions such as the Boudouard reaction, but generally it comes from the following reactions (6) and (7), according to which the ethanol is dehydrated to form ethylene (6), which is converted to coke by a polymerization reaction (7):

$$C_2H_5OH \rightarrow C_2H_4 + H_2O \qquad (6)$$

$$C_2H_4 \rightarrow coke \qquad (7)$$

Even in small quantities, ethylene quickly leads to the formation of solid carbon (coke), which poisons the surface of the catalyst and leads to a drop in catalytic activity.

This carbon deposit is known to be the most harmful element for the reaction of steam reforming of ethanol and it is the cause of deactivation of catalysts and clogging of industrial steam reforming reactors.

Another problem associated with the use of bio-ethanol is the high cost of the ethanol distillation process starting from an aqueous solution obtained by the fermentation of biomass.

In such a context, it has therefore become necessary to propose low-cost catalysts or electrocatalysts that are capable of cutting the C—C bonds of the organic compounds obtained from renewable resources such as bio-ethanol, and which give good performance even when the ethanol is supplied in the form of a very dilute aqueous solution, i.e. in which the molar ratio $H_2O/C_2H_5OH$ is high.

Suitable catalysts for carrying out steam reforming of an alcohol or of a mixture of alcohols must allow a high level of hydrogen production while avoiding formation of the aforementioned by-products.

The noble metals are well known in the literature as being highly active in hydrogenation/dehydrogenation and for promoting rupture of C—C bonds (Aupretre et al., *Catal. Commun.*, 2002, 263). Generally the noble metals that have been most studied are rhodium, ruthenium, palladium and platinum. However, their high cost is still a drawback of using these noble metals.

Numerous processes for production of hydrogen using low-cost catalysts have since been developed.

Firstly, base metals of the nickel or cobalt type were described; then mixed catalysts were proposed based on several metals in order to improve the active phases of the catalysts and reduce the formation of by-products.

For example, international application WO 2009/009844 describes the use of mixed catalysts based on cerium and a lanthanide and/or zirconium and/or yttrium, corresponding to the formula $Ce_xM_{1-x}O_2$. These catalysts are stable for about 30 hours and give good selectivities with respect to hydrogen without formation of carbon monoxide. However, when they are used, the steam reforming temperatures are high (of the order of 450° C.-500° C.) and the mixture obtained at the end of the reaction contains small quantities of acetaldehyde and ethylene.

Patent application US 2012/0201745 describes the use of catalysts of perovskite structure $La_{1-x}M_xNiO_3$ that are stable for about 30 hours and make it possible to avoid the formation of acetone and ethylene. However, the temperature at which the reaction of steam reforming must be carried out using these catalysts is also high (of the order of 500° C.) and the reaction leads to the formation of methane in amounts of the order of 5 to 10%.

Patent application FR 2 795 339 describes a process for steam reforming of ethanol in the presence of $Ni-Cu/SiO_2$ mixed catalyst. This process is carried out at a high temperature (of the order of 700° C.) but leads to a fairly low yield of hydrogen (below 40 mol %) and to the formation of a carbon deposit on the catalyst. Therefore formation of carbon is not avoided completely and the steam reforming temperature is high.

Finally, a mixed nano-oxyhydride catalyst based on cerium and nickel of formula $CeNi_{1.0}H_zO_y$ was recently proposed. This catalyst is prepared by coprecipitation of the corresponding hydroxides from mixtures of nitrates of cerium and nickel in the presence of triethylamine as precipitant. After filtration, the precipitate thus obtained is dried at 100° C., and then calcined at a temperature of 500° C. for 4 hours. The oxide of formula $CeNi_{1.0}O_y$ Obtained is then activated in the form of an oxyhydride of formula $CeNi_{1.0}H_zO_y$ by treatment under hydrogen at a temperature of 250° C. for 10 hours. The activated catalyst thus obtained is stable for 50 hours, it is selective and allows hydrogen to be produced from ethanol at low temperature, i.e. at temperatures of the order of about 60° C. (Pirez et al., *Angew. Chem. Int. Ed.*, 2011, 10193). However, using this catalyst for converting ethanol to hydrogen still has the drawback of generating 5% of a mixture of methane and acetaldehyde and a non-negligible amount of solid carbon, at a rate of about 63 mg per gram of catalyst per hour.

OBJECTS AND SUMMARY

The inventors therefore set themselves the goal of providing an economical material that may advantageously be used for catalysing the reaction of production of hydrogen at low temperature starting from ethanol, and more generally starting from lower alcohols, said catalyst not displaying the drawbacks of the catalysts of the prior art, and in particular leading to formation of hydrogen at a good yield, while avoiding the formation of solid carbon to the maximum.

Thus, the present invention relates to a process for production of hydrogen at low temperature by transformation of an alcohol or of a mixture of alcohols, said process comprising the following steps:

1) a first step of synthesis of an electrically neutral oxyhydride material M1, based on cerium, nickel, oxygen atoms, hydrogen atoms and optionally a metal M selected from Al and Zr, and in said material:

i) the Ni/Ce molar ratio varies from 0, 1 to 5, ii) the M/Ce molar ratio varies from 0 to 1, and iii) at least a proportion of the hydrogen atoms present in said material M1 is in the form of hydride ions, said synthesis being carried out according to the following substeps 1-i) to 1-v):

1-i) a first substep of preparation of an aqueous solution comprising at least one cerium precursor, at least one nickel precursor and optionally at least one precursor of metal M, 1-ii) a second substep of coprecipitation of said precursors of cerium, of nickel and optionally of metal M in the form of the corresponding hydroxides of cerium, of nickel and optionally of metal M, by adding at least one precipitant to said aqueous solution, 1-iii) a third substep of filtration of said hydroxides to obtain a filtered solid, 1-iv) a fourth substep of drying the filtered solid obtained above in substep 1-iii) at a temperature between about 40° C. and 150° C., for a time between about 1 and 24 hours, to obtain an electrically neutral solid material M2, based on cerium, nickel, oxygen atoms, hydrogen atoms and optionally a metal M, in which:

i) the definitions of the metal M, and of the molar ratios Ni/Ce and M/Ce are the same as those relating to the oxyhydride material M1, ii) at least a proportion of the hydrogen atoms present in said material M2 forms hydroxyl functions with the oxygen atoms, and iii) said solid material M2 is free from hydride ions, and 1-v) a fifth substep of treatment of the solid material M2 obtained above in the preceding step in the presence of hydrogen, to obtain an oxyhydride material M1, 2) a second step of contacting, at low temperature, the oxyhydride material M1 obtained above in the preceding step, firstly with a gas mixture comprising at least one lower alcohol, water and nitrogen, and then secondly with oxygen, said process being characterized in that the step of synthesis of the oxyhydride material M1 does not comprise a substep of calcination.

In the present invention, the expression "calcination step" signifies a step of thermal treatment at a temperature in the range from 300° C. to 800° C., notably for 1 to 6 hours, under air, oxygen or neutral gas.

Without wishing to be bound to any theory, the inventors think that the oxyhydride material M1 and the solid material M2 can be represented respectively by the following formulae (I) and (I'):

(I)

(I')

in which M is a metal selected from Al and Zr, $0 \leq p \leq 1$; $0.1 \leq x \leq 5$; the values of y, y', z, and z so far, however, not having been determined.

In fact, in contrast to what was published previously in patent application FR 2 876 996, which describes compounds corresponding to the formula $TM_aO_xH_y$, in which T is a rare earth such as cerium, M is a metallic element such as nickel and $0.01 \leq a \leq 10$; $1 \leq x \leq 10$ and $0.1 \leq y \leq 100$, the inventors noted that the materials M1 and M2 represented respectively by the above formulae (I) and (I') oxidize and/or rehydrate rapidly in air. Thus, as the methods for physicochemical characterizations currently available for evaluating the values of y, y', z, z' in said materials involve putting them back in air, these methods can only provide values that have considerable uncertainty and do not reflect reality.

In a preferred embodiment of the invention, the cerium precursor is a cerium(III) salt selected from cerium nitrate, cerium acetate and cerium chloride and the nickel precursor is a nickel(II) salt selected from nickel nitrate, nickel chloride and nickel sulphate.

Moreover, the precursor of the metal M may be a zirconium(IV) salt such as zirconium nitrate or an aluminium(III) salt such as aluminium nitrate.

Moreover, according to a preferred feature of the process of the invention, the concentration of cerium precursor and of nickel precursor in said aqueous solution varies independently from about 0.1 to 1 mol/l, a concentration close to 0.5 mold being particularly preferred for each of the precursors.

When the metal M is present, the concentration of precursor of metal M in said aqueous solution varies independently from about 0.1 to 1 mol/l The precipitant is preferably selected from triethylamine, ammonium hydroxide, potassium hydroxide, sodium hydroxide and sodium carbonate.

When said precursors of cerium and of nickel have coprecipitated in the form of the corresponding hydroxides of cerium and of nickel according to step 1-ii) and have been filtered according to step 1-iii), said filtered solid obtained may advantageously be washed and rinsed with water and/or with alcohol.

According to an especially preferred embodiment, the substep of drying 1-iv) is carried out at a temperature of about 100° C. for about 24 hours.

Physicochemical characterizations were carried out by the present inventors on the solid material M2 thus obtained in the drying substep 1-iv) of the process according to the invention (see example 1, paragraph 1.2 illustrating the present application). These various characterizations showed, on the one hand, that the solid material M2 comprises hydrogen atoms distributed in such a way that they are, very predominantly, in the form of hydroxyl functions and on the other hand that its structure differs from that of the oxide material of formula $CeNi_xO_y$, obtained by carrying out the process of Pirez et at, (ibid), which comprises a calcination step at 500° C.

During the next step 1-v) of the process according to the invention, said solid material M2 is able to incorporate hydride ions within anionic voids that are present in its crystal structure when it is brought into contact with hydrogen. An oxyhydride material M1 then forms, in which at least a proportion of the hydrogen atoms is in the form of hydride ions.

In fact, the reaction for treatment of the solid material M2 in the presence of hydrogen according to step 1-v) of the process according to the invention makes it possible to form hydride ions in situ, which are then inserted in the solid material.

During said step, several anionic voids (□) are formed in the solid material M2 starting from hydroxyl functions that are present, according to the following reaction (8):

$$2OH^- \rightarrow O^{2-} + \square + H_2O \qquad (8)$$

Then an active site of the solid material $O^{2-}M^{n+}\square$ (with $M^{n+}$ representing the cation of the solid) is created during activation of the solid material M2 at temperature in situ under hydrogen. This active site then allows heterolytic dissociation of the hydrogen, on the one hand by inserting a hydride $H^-$ in an anionic void and on the other hand by reacting a cation $H^+$ with an anion $O^{2-}$ of the solid material to form a hydroxyl function according to the following reaction (9):

$$O^{2-}M^{n+}\square + H_2 \rightarrow OH^-M^{n+}H^- \qquad (9)$$

Moreover, said oxyhydride material M1, obtained according to the mechanism presented above and comprising hydride ions, is pyrophoric in the presence of air and should not be exposed to the air even for a very short time.

In fact, the reaction between the hydride ion of the oxyhydride material M1 and oxygen (present in air) is very exothermic and leads to the formation of hydroxyl functions in said material according to the following reaction (10):

$$H^- + \tfrac{1}{2}O_2 \rightarrow OH^- \qquad (10)$$

The hydroxyl functions formed in said material can then be removed in the form of water.

Thus, any physicochemical characterization that involves putting the oxyhydride material M1 back in air leads to removal of the hydride ions.

This very great reactivity is used, moreover, as energy supply for carrying out the next step 2) of bringing the oxyhydride material M1 into contact with an alcohol at low temperature, in the process according to the invention.

The present inventors were able, however, to demonstrate the presence of the hydride ions in the oxyhydride material M1 obtained according to step 1-v) of the process of the invention by neutron diffusion experiments (see example 2, paragraph 2.2 illustrating the present application).

As an example, substep 1-v) of treatment of the solid material M2 in the presence of hydrogen may advantageously be carried out at atmospheric pressure at a temperature in the range from about 50° C. to 400° C. and even more preferably at a temperature of the order of 250° C., in order to obtain maximum incorporation of hydride ions in the oxyhydride material M1.

As a guide, when the temperature of treatment in the presence of hydrogen is about 250° C., the duration of substep 1-v) is then between 1 and 10 hours.

According to a particular preferred embodiment of the invention, substep 1-v) of treatment in the presence of hydrogen is carried out in situ, i.e. directly in a reactor suitable for the production of hydrogen by transformation of lower alcohols. This makes it possible to avoid the oxyhydride material M1 thus obtained during substep 1-v) being oxidized in the air before it is used in step 2).

The oxyhydride material M1 obtained at the end of synthesis step 1) of the process according to the invention, without undergoing a calcination step, is able to catalyse the reaction of low-temperature transformation of ethanol (and more generally of tower alcohols) and leads, in these conditions, to the formation of hydrogen at a good yield, while avoiding the formation of solid carbon, This result is particularly surprising, as the processes for manufacturing such catalysts usually proposed in the prior art, notably by Pirez et al, (ibid.), necessarily employ a calcination step, which generally consists of a thermal treatment at high temperature (of the order of 500° C.), and makes it possible to improve the stability of the catalyst and hence its catalytic activity.

Among the oxyhydride materials M1, those are preferred in which the M/Ce molar ratio is equal to zero, as well as those in which the Ni/Ce molar ratio varies from 0.3 to 1. The oxyhydride materials M1 in which the M/Ce molar ratio is equal to 0 and the Ni/Ce molar ratio varies from 0.3 to 1 are quite particularly preferred.

Moreover, when the M/Ce molar ratio is strictly greater than zero, the oxyhydride material M1 is, moreover, capable of storing large quantities of hydride ions. According to an even more preferred embodiment, the oxyhydride materials M1 will therefore be selected in which the M/Ce molar ratio is equal to about 0.5 and the Ni/Ce molar ratio varies from 0.3 to 1.

According to the invention, "lower alcohols" means alcohols having from 1 to 5 carbon atoms, among which we may mention methanol, ethanol, propan-1-ol, butan-1-ol and pentan-1-ol or a mixture of alcohols such as bio-ethanol.

In a preferred embodiment of the invention, the alcohol used in said gas mixture is ethanol.

According to the invention, the expression "at low temperature" denotes a temperature generally in the range from about 20° C. to 60° C.

Thus, the process according to the present invention, as described above, leads to a gas mixture consisting predominantly of hydrogen and carbon dioxide, limiting the formation of solid carbon to a very considerable extent.

According to a preferred embodiment of the invention, the amount of the solid material M2 used for substep 1-v) varies from about 0.01 to 0.05 g. This amount is quite particularly of the order of 0.03 g.

The contacting step 2) described above is carried out advantageously according to the following sequences:

2-i) introducing a water/alcohol/nitrogen gas mixture into a reactor comprising the oxyhydride material M1 obtained in the preceding step 1), at a temperature of at least 130° C., and more preferably at a temperature of 160° C., 2-ii) introducing oxygen into the reactor and maintaining the temperature for an induction period of at least 3 minutes, then 2-iii) lowering the temperature to a temperature below 60° C. or more preferably to a temperature of the order of 50° C.

In fact, the catalytic reaction must be initiated at a temperature of at least 130° C. After an induction period of some minutes, the temperature in the reactor increases. Then only a small supply of energy is necessary and the furnace temperature can be reduced to a temperature below 60° C.

The water/alcohol molar ratio within the gas mixture preferably varies from 1/2 to 13/1. Even more preferably, the water/alcohol molar ratio is about 3/1, The water/alcohol/nitrogen gas mixture fed into the reactor at the start advantageously contains 15 mol % of alcohol relative to the water/alcohol/nitrogen gas mixture. This makes it possible to maintain the solid in the oxyhydride form.

Moreover, addition of oxygen to the gas mixture leads favourably to an increase in ethanol conversion and to a decrease in the relative amounts of by-products such as methane $CH_4$, acetaldehyde $CH_3CHO$, acetone $(CH_3)_2CO$ and carbon monoxide CO.

Moreover, the amount of carbon dioxide $CO_2$ increases at the highest concentration of $O_2$, when the $O_2$/alcohol molar ratio is about 2.5/1.

Thus, according to a preferred embodiment of the process according to the invention, the $O_2$/alcohol molar ratio varies from about 0.5/1 to 2.5/1.

However, since the amount of hydrogen formed decreases when the $O_2$/alcohol molar ratio is above 1.2/1, a good compromise consists of fixing the $O_2$/alcohol molar ratio preferably at 1.6/1, In a preferred embodiment, an alcohol/water/$O_2$/$N_2$ gas mixture is used in which the molar proportions of the alcohoilwater/$O_2$/$N_2$ mixture are 1/3/1.6/1.3.

According to a preferred embodiment of the invention, the flow rate of the gas mixture varies from about 10 to 100 ml/min, and even more preferably it is of the order of about 60 ml/min.

Thus, the process for production of hydrogen according to the invention allows low-temperature transformation of alcohols to hydrogen at a good yield and very small supply of energy by using the oxyhydride catalyst M1 obtained according to step 1) of the process according to the invention as described above.

The process according to the invention also has the advantage of using a catalyst capable of improved performance since it is shown in the present application that the reaction of transformation of the alcohol can be carried out at a temperature of only 50° C.

Moreover, the process according to the invention means that the formation of methane and acetaldehyde can be avoided almost completely (<2%).

Moreover, it was discovered, surprisingly, that the formation of carbon could be avoided by eliminating the calcination step during synthesis of the oxyhydride material M1, which is then used in step 2) of the process for production of hydrogen according to the invention, Elimination of the calcination step, and lowering the temperatures of sequences 2-i) and 2-iii) during the transformation of alcohols to hydrogen in the process according to the invention, also make it possible to improve the production cost.

Finally, the invention also relates to the use of an oxyhydride material M1, as obtained by carrying out step 1) of synthesis of the process according to the invention, as catalyst for the reaction of transformation of lower alcohols to hydrogen at low temperature.

BRIEF DESCRIPTION OF THE DRAWINGS

FIGS. 1(I)-1(III) show variations in hydrogen consumption ($H_2$ cons., in arbitrary units a.u.) as a function of the temperature (in ° C.) for example 1, in accordance with one embodiment;

FIGS. 2(I)-2(II) show variation in intensity (in arbitrary units a.u.) as a function of the angle $2\theta$ (in degrees) for example 1, in accordance with one embodiment;

FIGS. 3(I)-3(II) show variation in intensity (in arbitrary units a.u.) as a function of the energy (in $cm^{-1}$) for example 1, in accordance with one embodiment:

FIGS. 5(I)-5(II) and 6(I)-6(I) show variation in intensity (in arbitrary units a.u.) as a function of energy (in $cm^{-1}$) for example 2, in accordance with one embodiment;

DETAILED DESCRIPTION

The present invention is illustrated by the following embodiment examples, but it is not limited to these.

Example 1

Preparation and Characterizations of Solid Materials M2 According to the Invention Comparisons with Calcined Compounds According to the Prior Art 1.1 Preparation of the Solid Materials M2 Resulting from the Drying, Step 1-iv) of the Process According to the Invention (Dried Compounds)

1.1-a) Preparation of the Dried Compound 1, in which the Ni/Ce Molar Ratio is Equal to 1 and the M/Ce Molar Ratio is Equal to 0

The dried compound 1 was prepared by coprecipitation of the corresponding hydroxides starting from a solution comprising a volume of 100 mL of 0.5 M aqueous solution of cerium nitrate and a volume of 100 mL of 0.5 M aqueous solution of nickel nitrate and using triethylamine as the precipitant.

Said solution was added dropwise, quickly, to a volume of 250 mL of a solution of triethylamine diluted to 1.5 Ni in methanol.

During this addition, formation of a precipitate of metal hydroxides was observed, which was filtered, washed and rinsed with a total volume equivalent to the volume recovered, 3 times, with water and with methanol. The solid obtained was then dried at 100° C. for 24 hours and ground.

1.1-b) Preparation of the Dried Compound 2, in which the Ni/Ce Molar Ratio is Equal to 0.5 and the M/Ce Molar Ratio is Equal to 0

The dried compound 2 was prepared by coprecipitation of the corresponding hydroxides starting from a solution comprising a volume of 200 mL of 0.5 M aqueous solution of cerium nitrate and a volume of 100 mL of 0.5 M aqueous solution of nickel nitrate and using triethylamine as the precipitant.

Said solution was added dropwise, quickly, to a volume of 375 mL of a solution of triethylamine diluted to 1.5 M in methanol.

During this addition, formation of a precipitate of metal hydroxides was observed, which was filtered, washed and rinsed with a total volume equivalent to the volume recovered, 3 times, with water and with methanol. The solid obtained was then dried at 100° C. for 24 hours and ground.

1.1-c) Preparation of the Dried Compound 3, in which the Ni/Ce Molar Ratio is Equal to 0.25 and the M/Ce Molar Ratio is Equal to 0

The dried compound 3 was prepared by coprecipitation of the corresponding hydroxides starting from a solution comprising a volume of 200 mL of 0.5 M aqueous solution of cerium nitrate and a volume of 50 mL of 0.5 M aqueous solution of nickel nitrate and using triethylamine as the precipitant.

Said solution was added dropwise, quickly, to a volume of 312.5 mL of a solution of triethylamine diluted to 1.5 NI in methanol.

During this addition, formation of a precipitate of metal hydroxides was observed, which was filtered, washed and rinsed with a total volume equivalent to the volume recovered, 3 times, with water and with methanol. The solid obtained was then dried at 100° C. for 24 hours and ground.

1.2 Characterization of the Dried Compounds 1, 2 and 3 and Comparison with Calcined Compounds According to the Prior Art The dried compounds 1, 2 and 3 were analysed by measurements of programmed temperature reduction (PTR).

These measurements were carried out with an analyser comprising a thermal conductivity detector (TCD), sold under the trade name Micromeritics AutoChem 2920 Analyzer by the company Micromeritics.

Figure 1:
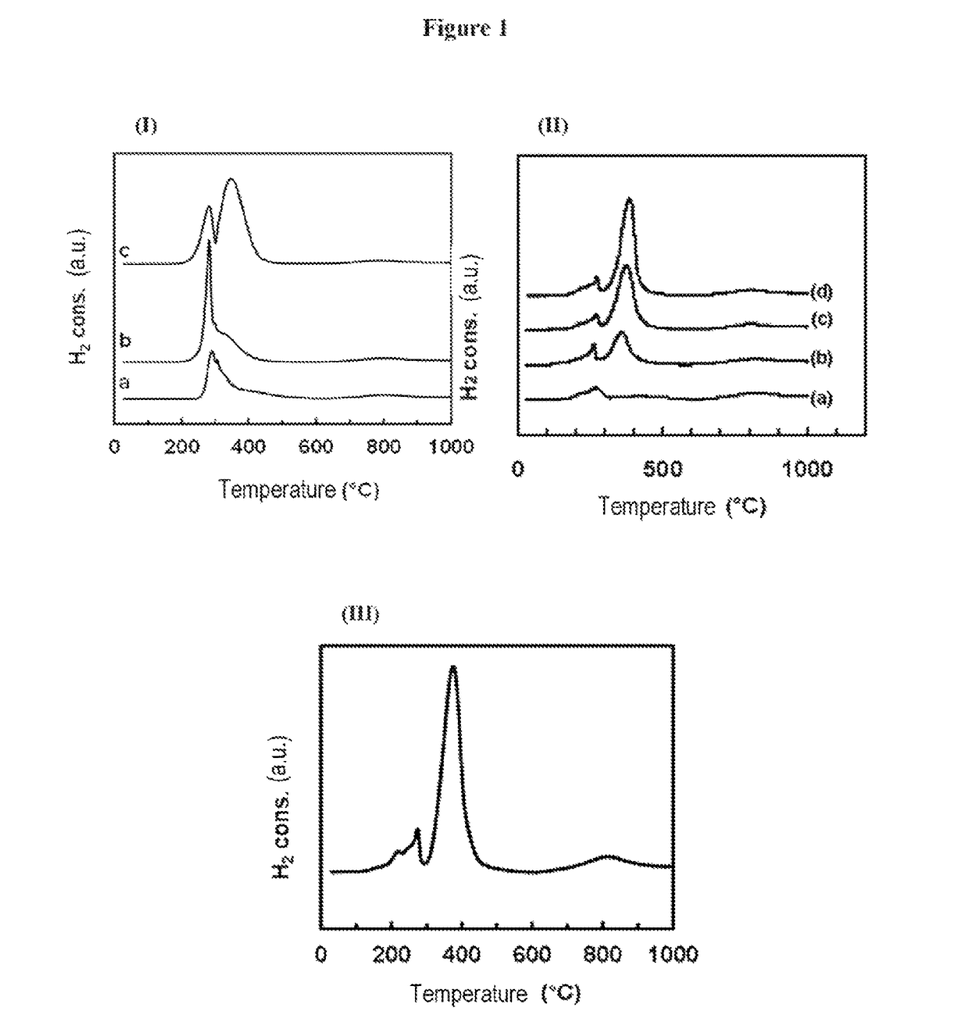

The appended FIG. 1 shows the variation in hydrogen consumption ($H_2$ cons., in arbitrary units a.u.) as a function of the temperature (in ° C.) on the one hand for the dried compounds 1, 2 and 3 resulting from step 1-iv) of the process according to the invention (solid materials M2) and on the other hand for certain calcined compounds corresponding to the formula $CeNi_xO_y$ already described in Pirez et al. (ibid.) and in Jalowiecki-Duhamel et al., Int. J. Hydrogen Energy, 2010, 35, 12741-12750.

In FIG. 1, the first peak corresponds to the temperature required for carrying out the step of treatment in the presence of hydrogen, leading to an oxyhydride. It has been shown, moreover, that a higher temperature of treatment in the presence of hydrogen leads to a decrease in the rate of ethanol conversion during the next step of bringing the ethanol into contact with the oxyhydride previously formed.

According to FIG. 1, the dried compounds 3 (FIG. 1-Ia), 2 (FIG. 1-Ib) and 1 (FIG. 1-Ic) must be treated in the presence of hydrogen at a temperature between 200° C. and 300° C. and more particularly at a temperature of about 250° C.-270° C. In fact, a peak of reduction at low temperature is observed at 250-270° C.

For comparative purposes, the compounds calcined at 500° C. $CeNi_{0.2}O_y$ (FIG. 1-IIa), $CeNi_{0.4}O_y$ (FIG. 1-IIb), $CeNi_{0.7}O_y$ (FIG. 1-IIc), $CeNi_{0.9}O_y$ (FIG. 1-IId) and $CeNi_{1.0}O_y$ (FIG. 1-III) must also be treated in the presence of hydrogen at a temperature between 200° C. and 300° C.

In conclusion, FIG. 1 shows that the dried compounds 1, 2 and 3 (solid materials M2) display behaviour that is different from the calcined compounds at so equivalent nickel content with a far greater peak of reduction at low temperature on the dried compounds 1, 2 and 3 (solid materials M2).

Moreover, analyses by X-ray diffractometry (XRD) of the dried compounds 1, 2 and 3 (solid materials M2 obtained according to step 1-iv) of the process according to the invention) and, for comparative purposes, of certain calcined compounds described in the work of Ponchel et al. (Phys. Chem. Chem. Phys., 2000, 2, 303-312), were carried out.

The XRD analyses were carried out using a diffractometer sold under the trade name D8 Advance by the company Bruker.

These analyses make it possible to show whether the compounds have a ceria phase $CeO_2$ and/or a nickel phase. The nickel phase in the calcined compounds of the prior art corresponds to nickel oxide NiO. The nickel phase in the dried compounds 1, 2 and 3 (solid materials M2) obtained according to the process of the invention, when observed by XRD, corresponds to a complex mixture of nickel hydroxides. For low Ni contents, no phase associated with Ni is observed, therefore it may be amorphous and/or the nickel ions may be inserted in the ceria phase, forming a solid solution.

Figure 2:
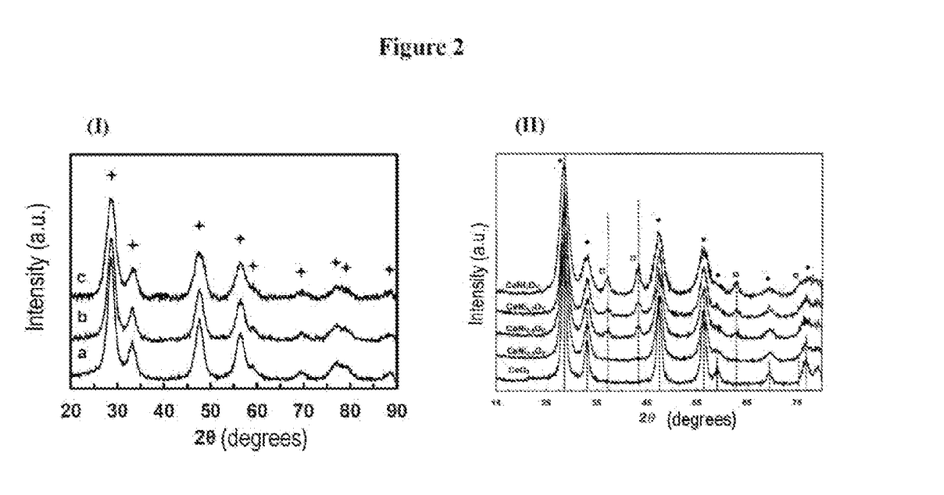

FIG. 2 shows the variation in intensity (in arbitrary units a.u.) as a function of the angle 2θ (in degrees). In FIG. 2-I, the crosses correspond to the ceria phase $CeO_2$. In FIG. 2-II the filled circles correspond to the ceria phase $CeO_2$ and the empty squares correspond to the nickel phase.

FIG. 2-I shows absence of a nickel phase in the dried compounds 3 (FIG. 2-Ia), 2 (FIG. 2-Ib) and 1 (FIG. 2-Ic), obtained by the process according to the invention.

For comparative purposes, FIG. 2-II shows that the nickel phase is not observed in the compound CeO, and in the compound calcined at 500° C. $CeNi_{0.2}O_y$, which has a very low nickel content. In contrast, it is observed in the compounds calcined at 500° C. $CeNi_{0.5}O_y$, $CeNi_{0.7}O_y$, and $CeNi_{1.0}O_y$.

Regarding the ceria phase, it is observed in the dried compounds 1, 2 and 3 according to the invention, as well as in all the calcined compounds of the prior art. In contrast, the presence of a background noise in the XRD spectra corresponding to the dried compounds according to the invention (FIG. 2-I) indicates that the ceria phase is crystallized less well in these compounds than in the calcined compounds of the prior art (FIG. 2-II.

Finally, measurements of specific surface area of the dried compounds 1, 2 and 3 (solid materials M2) obtained according to the process of the invention were carried out.

These measurements of specific surface areas were performed using the BET method (Brunauen-Emmett-Teller) and were carried out with equipment sold under the trade name Tristar II 3020 by the company Micromeritics.

Table 1 below shows the specific surface areas (in $m^2 \cdot g^{-1}$) the dried compounds 1, 2 and 3 and, for comparison, of various calcined compounds of formula $CeNi_xO_y$ (x in the range from 0.07 to 1), of NiO and of $CeO_2$ reported in Pirez et al. (ibid.) and Jalowiecki-Duhamel et al. (ibid.).

TABLE 1

| Dried compounds | Specific surface area (B.E.T) $m^2 \cdot g^{-1}$ | Crystallite size[a] nm | |
|---|---|---|---|
| | | $CeO_2$ | Nickel hydroxides |
| 1 | 145 | 3.3 | — |
| 2 | 141 | 4.2 | — |
| 3 | 75 | 4.6 | — |

| Calcined compounds of the prior art | Specific surface area (B.E.T) $m^2 \cdot g^{-1}$ | Crystallite size[a] nm | |
|---|---|---|---|
| | | $CeO_2$ | NiO |
| $CeNi_{5.0}Oy$ | 84 | 4.6 | 9.4 |
| $CeNi_{1.0}Oy$ | 94 | 5.0 | 10.0 |
| $CeNi_{0.9}Oy$ | 109 | 4.4 | 11.0 |
| $CeNi_{0.7}Oy$ | 91 | 4.8 | 12.0 |
| $CeNi_{0.4}Oy$ | 136 | 4.7 | 8.0 |
| $CeNi_{0.2}Oy$ | 100 | 5.1 | — |
| $CeNi_{0.07}Oy$ | 92 | 5.6 | — |
| $CeO_2$ | 61 | 7.8 | — |
| NiO | 27 | — | 20.8 |

[a]deduced from XRD analysis using Scherrer's equation

In conclusion, the specific surface areas are of the same order of magnitude throughout for the dried compounds 1, 2 and 3 according to the invention and the calcined compounds according to the prior art.

In contrast, it appears that the specific surface area of the dried compound 1 is greater (145 $m^2 \cdot g^{-1}$) than the specific surface area of a calcined compound ($CeNi_{1.0}O_y$)(94 $m^2 \cdot g^{-1}$) with the same nickel content.

Table 1 also shows the size (in nm) of the crystallites of the ceria phase and the size (in nm) of the crystallites of the nickel phase in the various compounds when it was possible to determine them.

In fact, in the calcined compounds according to the prior art, when x≤0.3 (low nickel content), the size of the crystallites of the nickel phase cannot be Obtained. Moreover, the size of the crystallites of the nickel phase cannot be obtained for the dried compounds 1, 2 and 3. In fact, it was observed that in these dried compounds, the nickel phase appears when the Ni/Ce molar ratio is strictly greater than 1. These observations are in agreement with the XRD spectra described above.

Moreover, the size of the crystallites of the ceria phase could be determined for all the dried and calcined compounds. According to Table 1, the average size of w the particles of $CeO_2$ in the dried compounds is smaller compared to the average size of the particles of $CeO_2$ in the calcined compounds.

Neutron diffusion experiments (INS) were also carried out on the dried compound 1 using the spectrometer IN1 Lagrange of the Institut Lane Langevin de Grenoble, France (ILL), at 10 K using a Cu(220) monochromator for the energy transfers between 200 and 2500 $cm^{-1}$ and compared to those reported previously on the compound calcined at 500° C. $CeNi_{1.0}O_y$, and obtained using the IN1 spectrometer of the Institut Lane Langevin de Grenoble, France (ILL), at 10 K using a monochromator of Cu(220) for the energy transfers between 200 and 2500 $cm^{-1}$.

Before performing the INS analyses, the solid that we wish to analyse is placed in a cell of the apparatus and undergoes a treatment in situ under vacuum at 200° C. for 2 hours. This treatment can thus ensure that the physisorbed water present in the ambient air has been removed completely.

Figure 3:
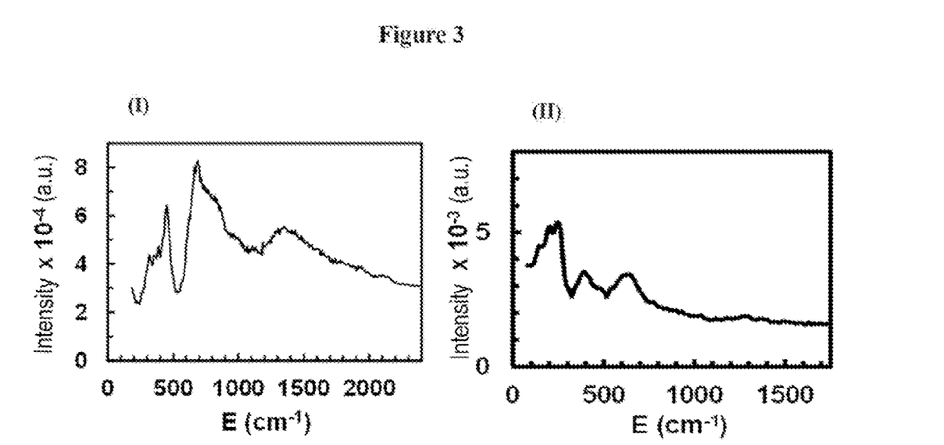

FIG. 3 shows the variation in intensity (in arbitrary units a.u.) as a function of the energy (in $cm^{-1}$).

More particularly, FIG. 3 shows the neutron diffusion analysis of the dried compound 1 (FIG. 3-I) and, for comparison, the analysis of the calcined compound $CeNi_{1.0}O_y$ already described in Jalowiecki-Duhamel et al., Int. J. Nuclear Hydrogen Production and Applications, 2009, 2, 2, 148-158 (FIG. 3-II.

FIG. 3-I shows the presence of numerous hydroxyl functions in the dried compound 1 characterized by the peaks at 440 $cm^{-1}$ and 660 $cm^{-1}$. FIG. 3-II also shows the presence of hydroxyl functions in the compound calcined at 500° C. $CeNi_{1.0}O$ characterized by the peaks at 250 $cm^{-1}$, 400 $cm^{-1}$ and 630 $cm^{-1}$.

Moreover, the chemical formulae of the dried compounds 1, 2 and 3 were evaluated on the basis of results of elemental analyses and are as follows:

for compound 1: $CeM_pNi_xO_yH_{z'}$ (I'-1) in which p=0, x=1, y'=5.8 and z' 3.8.

for compound 2: $CeM_pNi_xO_yH_{z'}$ (I'-2) in which p=0, x=0.4, y'=4.0 and z=2.4, for compound 3: $CeM_pNi_xO_yH_{z'}$ (I'-3) in which p=0, x=0.2, y'=3.3 and z'=2.1.

Example 2

Production of Hydrogen by the Process According to the Invention 2.1 Production of Hydrogen by the Process According to the Invention Catalysed by an Oxyhydride Material M1 in which the Ni/Ce Molar Ratio is Equal to 1 and the M/Ce Molar Ratio is Equal to 0 (Catalyst 1)

0.03 g of the dried compound 1 obtained above in example 1.1-a) (solid material M2) was put in a quartz reactor. This material was then treated in situ with hydrogen at 250° C. for 10 hours to form the corresponding oxyhydride material M1 (catalyst 1).

A mixture of water and ethanol was prepared with a water/ethanol molar ratio of 3/1.

The resultant mixture was heated and vaporized in a preheating chamber in a nitrogen stream in such a way that about 15 mol % of ethanol relative to the ethanol/water/nitrogen gas mixture was used.

The reactor containing catalyst 1 was then supplied with a gaseous stream of ethanol/water/nitrogen mixture at 165° C. with a total gas flow rate of 60 ml/min. Then oxygen was fed into the reactor in such a way that the ethanol/water/oxygen/nitrogen gas mixture is 1/3/1.6/1.3 with a total gas flow rate of 60 ml/min. The furnace temperature was maintained for 2-3 minutes after introduction of the oxygen and was then lowered to 50° C.

The measured reaction temperature was 320° C. inside the reactor, largely due to the reactivity between the hydride ions and oxygen.

The reaction was stable for at least 50 hours.

The gases were analysed in line at reactor outlet by gas chromatography (GC) using a chromatograph coupled to a flame ionization detector (HD) and to a thermal conductivity detector (TCD), sold under the trade name Trace GC Ultra by the company Thermo Electron Corporation.

Figure 4:
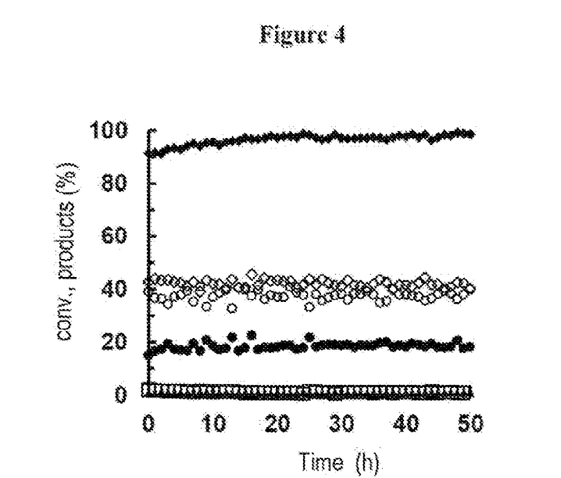
FIG. 4 shows that the reaction developed in a stable manner and that the hydrogen compound is obtained in a high proportion for example 2, in accordance with one embodiment.

The data were collected as a function of time and are reported in the appended FIG. 4, in which the ethanol conversion rate (in mol %, filled black diamonds) and the distribution of the different gas species formed and analysed in line (in mol %) are expressed as a function of time (in h), the empty diamonds corresponding to $H_2$, the empty circles to $CO_2$, the filled black circles to CO, the empty triangles to $CH_4$ and the empty squares to acetaldehyde $CH_3CHO$.

Complete conversion of the ethanol and oxygen was obtained.

The appended FIG. 4 shows that the reaction developed in a stable manner and that the hydrogen compound is obtained in a high proportion.

The products formed are gaseous and comprise 42 mol % of $H_2$, 38 mol % of $CO_2$ and 18 mol % of CO.

Very small amounts of methane and acetaldehyde are present ($CH_4+CH_3CHO \leq 1.6\%$).

Extremely slight formation of carbon was observed after 50 hours of reaction (4 mg/gh) compared to a value of 63 mg/gh reported in the work of Pirez et al. (ibid.) using an oxyhydride that had undergone a calcination step.

2.2 Characterization of the Oxyhydride Material M1 in which the Ni/Ce Molar Ratio is Equal to 1 and the M/Ce Molar Ratio is Equal to 0 (Catalyst 1)

Neutron diffusion experiments (INS) were carried out on catalyst 1 obtained according to the process of the invention and, for comparison, on the oxyhydride catalyst obtained by the process described in Pirez et al. (ibid.) using the same apparatus as that described above in example 1.2.

Figure 5:
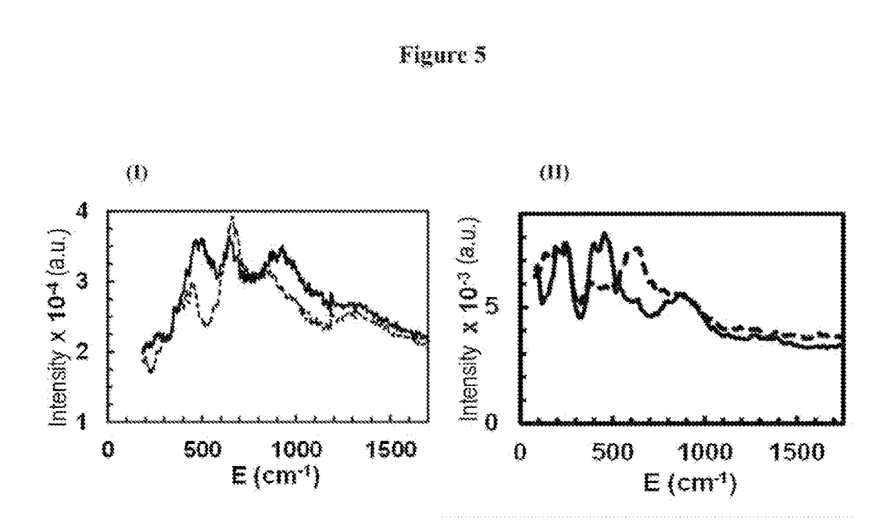
Figure 6:
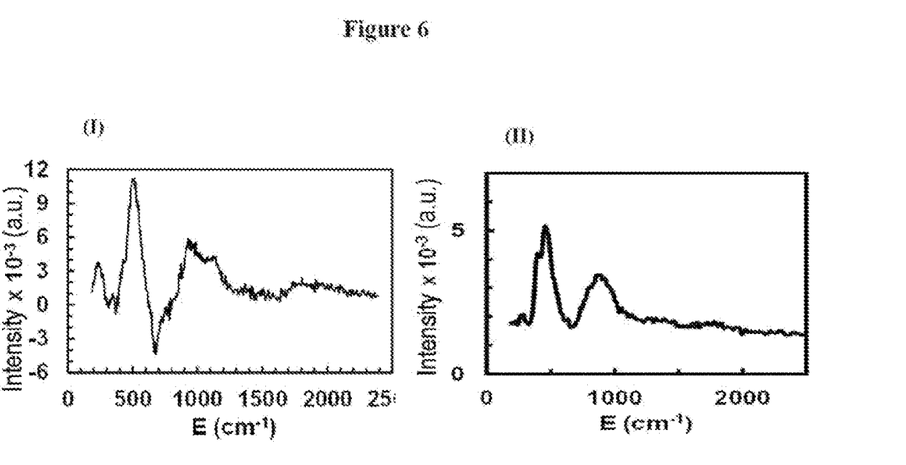

FIGS. 5 and 6 show the variation in intensity (in arbitrary units a.u.) as a function of energy (in $cm^{-1}$), FIG. 5-I shows the neutron diffusion analysis of catalyst 1, obtained after treatment of the dried compound 1 in the presence of hydrogen for 10 hours at 250° C. according to step 1-v) of the process according to the invention (curve drawn with solid line). Three broad peaks are observed at about 470 $cm^{-1}$, 640 $cm^{-1}$ and 900 $cm^{-1}$. The peak at 470 $cm^{-1}$ can be attributed to the hydride ions. When the catalyst 1 obtained is treated in the presence of oxygen (curve drawn with dotted line), the peaks at 470 $cm^{-1}$ and at 900 $cm^{-1}$ decrease, the reaction being very exothermic, and several broad peaks are observed, including peaks at 440 $cm^{-1}$ and at 660 $cm^{-1}$ indicating formation of hydroxyl functions during oxidation.

For comparative purposes, FIG. 5-II shows the neutron diffusion analysis of the oxyhydride obtained after treatment of the calcined compound of the prior art $CeNi_{1.0}O_y$, in the presence of hydrogen for 10 hours at 250° C. according to Jalowiecki-Duhamel et al., Int. J. Nuclear Hydrogen Production and Applications, 2009, 2, 2, 148-158 (curve drawn with solid line). When the oxyhydride obtained is treated in the presence of oxygen, the INS spectrum is represented by the curve drawn with a dotted line.

In conclusion, the neutron diffusion analyses of catalyst 1 obtained according to the process of the invention (FIG. 5-I) and the oxyhydride obtained according to the process of the prior art comprising a calcination step (FIG. 5-II are different.

FIG. 6-I shows the difference between the two INS spectra in FIG. 5-I curve drawn with solid line in FIG. 5-I minus curve drawn with dotted line in FIG. 5-I) FIG. 6-II shows the difference between the two INS spectra in FIG. 5-II (curve drawn with solid line in FIG. 5-II minus curve drawn with dotted line in FIG. 5-II.

FIG. 6 thus provides good visualization of the hydride ions inserted during the treatment in the presence of hydrogen and which then reacted and disappeared during the treatment in the presence of oxygen. These hydride ions are thus characterized by a fairly thin peak at 490 $cm^{-1}$.

Example 3

Production of Hydrogen by the Process According to the Invention

In this example, production of hydrogen was carried out, catalysed by an oxyhydride material M1 in which the Ni/Ce ratio is equal to 0.5 and the M/Ce ratio is equal to 0 (catalyst 2).

0.03 g of the dried compound 2 as obtained above in example 1.1-b) was put in a quartz reactor. This material was then treated in situ with hydrogen at 250° C. for 10 hours to form the corresponding oxyhydride material M1 (catalyst 2).

A mixture of water and ethanol was prepared with a water/ethanol molar ratio of 3/1.

The resultant mixture was heated and vaporized in a preheating chamber in a nitrogen stream in such a way that about 15 mol % of ethanol relative to the ethanol/water/nitrogen gas mixture was used.

The reactor containing the catalyst 2 was then supplied with a gaseous stream of ethanol/water/nitrogen mixture at 160° C. with a total gas flow rate of 60 ml/min. Then oxygen was fed into the reactor in such a way that the ethanol/water/oxygen/nitrogen gas mixture is 1/3/1.6/1.3 with a total gas flow rate of 60 ml/min. The furnace temperature was maintained for 2-3 minutes after introduction of the oxygen and was then lowered to 50° C.

The measured reaction temperature was 335° C. inside the reactor, largely due to the reactivity between the hydride ions and oxygen.

The reaction was stable for at least 75 hours.

The gases are analysed in line at reactor outlet by gas chromatography as indicated above in example 2.

Figure 7:
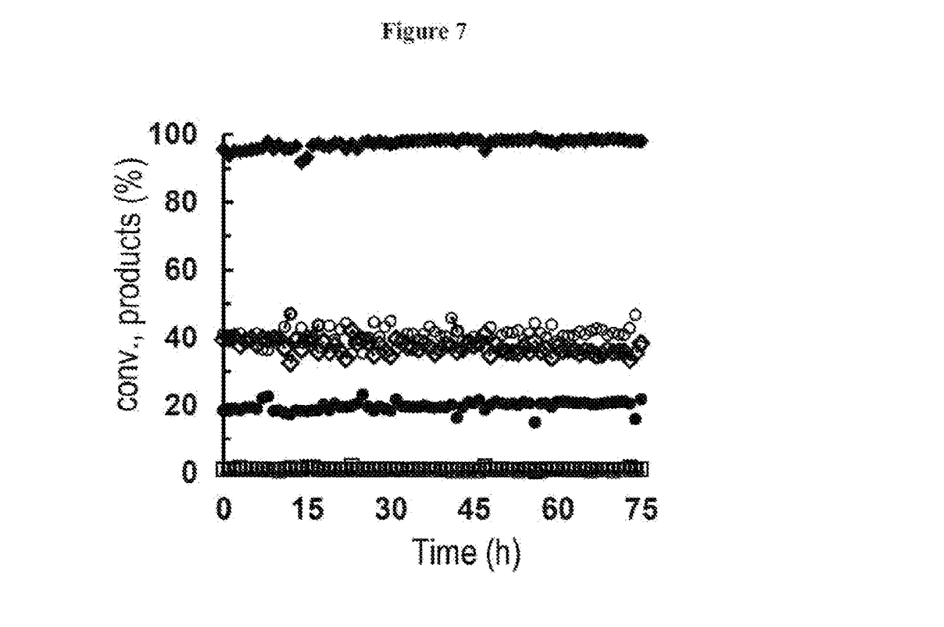
FIG. 7 shows an ethanol conversion rate in example 3, in accordance with one embodiment.

The data were collected as a function of time and are reported in the appended FIG. 7, in which the ethanol conversion rate (in mol %, filled black diamonds) and the distribution of the different gas species formed and analysed in line (in mol %) are expressed as a function of time (in h), the empty diamonds corresponding to $H_2$, the empty circles to $CO_2$, the filled black circles to CO, the empty triangles to $CH_4$ and the empty squares to acetaldehyde $CH_3CHO$.

Complete conversion of the ethanol and oxygen was obtained.

The appended FIG. 7 shows that the reaction developed in a stable manner and that the hydrogen compound is obtained in a high proportion.

The products formed are gaseous and comprise 37 mol % of $H_2$, 41 mol % of $CO_2$ and 20 mol % of CO.

Very small amounts of methane and acetaldehyde are present ($CH_4+CH_3CHO \leq 1.7\%$).

Extremely slight formation of carbon was observed after 75 hours of reaction (1.2 mg/gh) compared to a value of 63 mg/gh reported in the work of Pirez et al. (ibid.) using an oxyhydride that had undergone a calcination step.

Example 4

Production of Hydrogen by the Process According to the Invention

In this example, production of hydrogen was carried out, catalysed by an oxyhydride material M1 in which the Ni/Ce ratio is equal to 0.25 and the M/Ce ratio is equal to 0 (catalyst 3).

0.03 g of the dried compound 3 as obtained above in example 1.1-c) was put in a quartz reactor. This material was then treated in situ with hydrogen at 250° C. for 10 hours to form the corresponding oxyhydride material M1 (catalyst 3).

A mixture of water and ethanol was prepared with a water/ethanol molar ratio of 3/1.

The resultant mixture was heated and vaporized in a preheating chamber in a nitrogen stream in such a way that about 15 mol % of ethanol, relative to the ethanol/water/nitrogen gas mixture, was used, The reactor containing the catalyst 3 was then supplied with a gaseous stream of ethanol/water/nitrogen mixture at 256° C. with a total gas flow rate of 60 ml/min. Then oxygen was fed into the reactor in such a way that the ethanol/water/oxygen/nitrogen gas mixture is 1/3/1.6/1.3 with a total gas flow rate of 60 ml/min. The furnace temperature was maintained for 2-3 minutes after introduction of the oxygen and was then lowered to 50° C.

The measured reaction temperature was 335° C. inside the reactor, largely due to the reactivity between the hydride ions and oxygen.

The reaction was stable for at least 20 hours.

The gases are analysed in line at reactor outlet by gas chromatography as indicated above in example 2.

Figure 8:
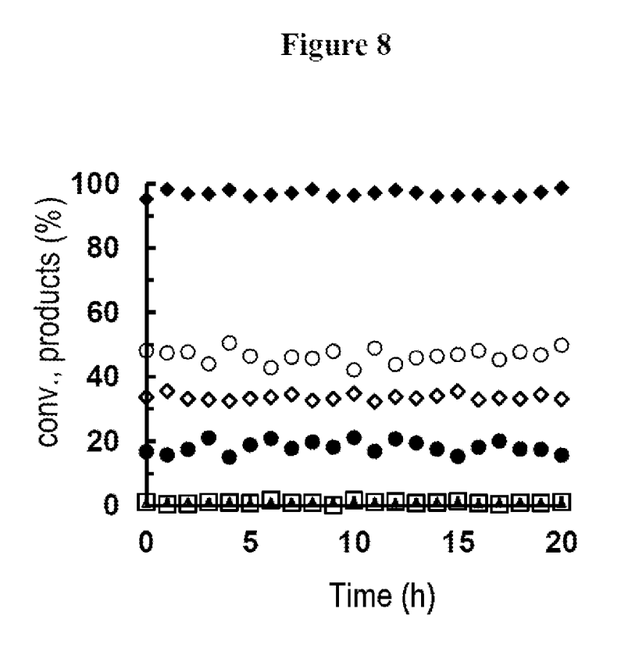
FIG. 8 shows an ethanol conversion rate in example 4, in accordance with one embodiment.

The data were collected as a function of time and are reported in the appended FIG. 8, in which the ethanol conversion rate (in mol %, filled black diamonds) and the distribution of the different gas species formed and analysed in line (in mol %) are expressed as a function of time (in h), the empty diamonds corresponding to $H_2$, the empty circles to $CO_2$, the filled black circles to CO, the empty triangles to $CH_4$ and the empty squares to acetaldehyde $CH_3CHO$.

Complete conversion of the ethanol and oxygen was obtained.

The appended FIG. 8 shows that the reaction developed in a stable manner and that the hydrogen compound is obtained in a high proportion.

The products formed are gaseous and comprise 34 mol % of $H_2$, 47 mol % of $CO_2$ and 18 mol % of CO.

Very small amounts of methane and acetaldehyde are present ($CH_4+CH_3CHO \leq 1.8\%$).

No formation of carbon was observed after 20 hours of reaction, compared to a value of 63 mg/gh reported in the work of Pirez et al. (ibid.) using an oxyhydride that had undergone a calcination step.

The invention claimed is:

1. Process for production of hydrogen at low temperature by transformation of an alcohol or of a mixture of alcohols, said process comprising the steps of:
   1) a first step of synthesis of an electrically neutral oxyhydride material M1, based on cerium, nickel, oxygen atoms, hydrogen atoms and optionally a metal M selected from Al and Zr, and in said material:
      i) the Ni/Ce molar ratio varies from 0.1 to 5,
      ii) the M/Ce molar ratio varies from 0 to 1, and
      iii) at least a proportion of the hydrogen atoms present in said material M1 is in the form of hydride ions, said synthesis being carried out according to the following substeps 1-i) to 1-v):
   1-i) a first substep of preparation of an aqueous solution comprising at least one cerium precursor, at least one nickel precursor and optionally at least one precursor of metal M,
   1-ii) a second substep of coprecipitation of said precursors of cerium, of nickel and optionally of metal M in the form of the corresponding hydroxides of cerium, of nickel and optionally of metal M, by adding at least one precipitant to said aqueous solution,
   1-iii) a third substep of filtration of said hydroxides to obtain a filtered solid,
   1-iv) a fourth substep of drying the filtered solid obtained above in substep 1-iii) at a temperature between 40° C. and 150° C., for a time between 1 and 24 hours, to obtain an electrically neutral solid material M2 based on cerium, nickel, oxygen atoms, hydrogen atoms and optionally a metal M, in which:
      i) the definitions of metal M and the Ni/Ce and M/Ce molar ratios are the same as those relating to the oxyhydride material M1,
      ii) at least a proportion of the hydrogen atoms present in said material M2 forms hydroxyl functions with the oxygen atoms, and
      iii) said solid material M2 is free from hydride ions, and
   1-v) a fifth substep of treatment of the solid material M2 obtained above in the preceding step in the presence of hydrogen, to obtain an oxyhydride material M1,
   2) a second step of contacting, at low temperature, the oxyhydride material M1 obtained above in the preceding step, firstly with a gas mixture comprising at least one lower alcohol, water and nitrogen, then secondly with oxygen, wherein the step of synthesis of the oxyhydride material M1 does not comprise a substep of calcination.

2. Process according to claim 1, wherein the cerium precursor is a cerium(III) salt selected from cerium nitrate, cerium acetate and cerium chloride and in that the nickel precursor is a nickel(II) salt selected from nickel nitrate, nickel chloride and nickel sulphate.

3. Process according to claim 1, wherein the concentration of cerium precursor and of nickel precursor in said aqueous solution varies independently from 0.1 to 1 mol/l.

4. Process according to claim 1, wherein the precipitant is selected from triethylamine, ammonium hydroxide, potassium hydroxide, sodium hydroxide and sodium carbonate.

5. Process according to claim 1, wherein the low temperature is a temperature in the range from 20° C. to 60° C.

6. Process according to claim 1, wherein the substep 1-v) of treatment of the solid material M2 in the presence of hydrogen is carried out at a temperature from 50° C. to 400° C.

7. Process according to claim 1, wherein the oxyhydride material M1 is selected from those in which the M/Ce molar ratio is equal to zero and the Ni/Ce molar ratio varies from 0.3 to 1.

8. Process according to claim 1, wherein said alcohol is selected from methanol, ethanol, propan-1-ol, butan-1-ol and pentan-1-ol and bio-ethanol.

9. Process according to claim 1, wherein said contacting step 2) is carried out according to the following sequences:
   2-i) introducing a water/alcohol/nitrogen gas mixture into a reactor comprising oxyhydride material M1 obtained in the preceding step 1), at a temperature of at least 130° C.,
   2-ii) introducing oxygen into the reactor and maintaining the temperature for an induction period of at least 3 minutes, then
   2-iii) lowering the temperature to a temperature below 60° C.

10. Process according to claim 9, wherein said water/alcohol/nitrogen gas mixture is fed into the reactor at a temperature of 160° C. during sequence 2-i) and in that the temperature is lowered to a temperature of 50° C. during step 2-iii).

11. Process according to claim 9 wherein said water/alcohol/nitrogen gas mixture fed into the reactor at the start contains 15 mol % of alcohol relative to the water/alcohol/nitrogen gas mixture.

12. Process according to claim 1, wherein the water/alcohol molar ratio in the gas mixture varies from 1/2 to 13/1.

13. Process according to claim 1, wherein the flow rate of the water/alcohol/nitrogen/oxygen gas mixture varies from 10 to 100 ml/min.

14. Process according to claim 1, wherein the $O_2$/alcohol molar ratio varies from 0.5/1 to 2.5/1.

15. Process according to claim 1, wherein an alcohol/water/$O_2$/$N_2$ gas mixture is used in which the molar proportions of the alcohol/water/$O_2$/$N_2$ mixture are 1/3/1.6/1.3.

* * * * *